United States Patent Office 3,652,732
Patented Mar. 28, 1972

3,652,732
SOLVENTLESS ENCAPSULATING BLOCK COPOLYMERS
Henry S. Makowski, Scotch Plains, Merrill Lynn, Elizabeth, and John J. Jaruzelski, Westfield, N.J., assignors to Esso Research and Engineering Company, Linden, N.J.
No Drawing. Continuation-in-part of application Ser. No. 545,839, Apr. 28, 1966. This application Nov. 5, 1968, Ser. No. 773,630
Int. Cl. C08f 15/04
U.S. Cl. 260—880 B
7 Claims

ABSTRACT OF THE DISCLOSURE

Solventless, room temperature-pourable, encapsulating block copolymers and terpolymers may be prepared by polymerizing a diolefin (e.g. butadiene) or copolymerizing a diolefin-monovinyl aromatic hydrocarbon (e.g. butadiene and styrene) with an organolithium catalyst so as to obtain a poly-diolefin homo- or copolymer-terminated with lithium residues. The lithium-containing homo- or copolymer is then reacted with a multi-vinyl compound (e.g. divinyl benzene) and the resultant block co- or terpolymer is recovered after inactivation of the catalyst.

CROSS-REFERENCE TO RELATED APPLICATION

This application is a continuation-in-part of our prior application Ser. No. 545,839, filed Apr. 28, 1966, now abandoned.

THE PRIOR ART

High molecular weight rubbery copolymers of conjugated dienes and monovinyl aromatic compounds are well known in the prior art, e.g. see U.S. Pat. 3,198,774 and British Pat. 964,478. However, these prior are copolymers which are elastomeric solids are entirely unsuitable for encapsulation purposes since such uses require polymers which are pourable, i.e., liquid, at room temperatures.

It is well known in the prior art to prepare solid, high molecular weight terpolymers by reacting a monomeric mixture of a diolefin, monovinyl aromatic and multivinyl aromatic with a peroxide catalyst. However, such terpolymers are wholly unsuitable for encapsulation purposes since they are insoluble, highly crosslinked materials.

Adams et al. (U.S. 3,185,659) teach that laminating graft terpolymers may be prepared by first reacting a monovinyl aromatic with a polydiolefin (prepared by means of a sodium catalyst) in the presence of a peroxide catalyst and thereafter adding a divinyl aromatic with further amounts of a peroxide catalyst. Alternatively, Adams et al. prepare such terpolymers by reacting the sodium catalyst prepared polydiolefin with a mixture of monovinyl aromatic and multivinyl aromatic in the presence of a peroxide catalyst. As a third alternate, Adams et al. treat a sodium catalyst prepared copolymer of a diolefin and monovinyl aromatic with a multivinyl aromatic and a peroxide catalyst.

The Adams et al. polymers differ in several critical respects from those of the instant invention. Firstly in the Adams et al. polymers, the polydiolefinic backbone is predominantly (i.e. about 70 mole percent) of 1,2-type structure, whereas in the polymers of this invention, the polydiolefinic backbone is predominantly (i.e. at least about 80 mole percent) 1,4-type structure:

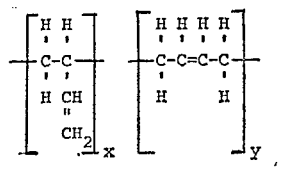

Adams et al.
x = >70 mole %, y = <30 mole %

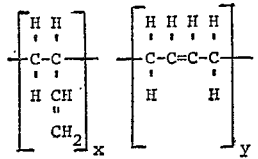

Instant Case
x = <20 mole %, y = >80 mole %

Secondly, the Adams et al. terpolymers are of the graft type whereas in the instant case, the co- or terpolymers are of the block type (A is butadiene, B is styrene, C is divinyl benzene):

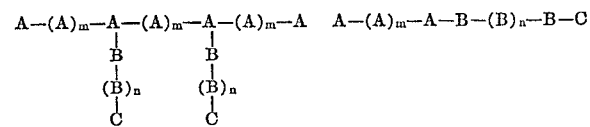

Adams et al.
$m=10$ to $15$, $n=8$ to $12$

Instant Case
$m=3$ to $<200$, $n=0$ to $<100$

The base polybutadienes and butadiene-styrene copolymers used by Adams et al. are, by virtue of their predominant 1,2-type structure, generally liquids of very high viscosity. Moreover, it is well known that, for a given molecular weight, graft terpolymers (Adams et al.) have much higher viscosities than block terpolymers (the instant case). Thus, the Adams et al. polymeric materials all require the use of extraneous solvents which are disadvantageous for the reasons set forth below. Moreover, the Adams et al. process leads to the undesirable formation of solid homo-polystyrene which possesses no activity in subsequent crosslinking reactions and undesirably acts as a polymeric filler.

It is also well known that pourable diolefinic homopolymers and copolymers may be prepared by conventional alkyl lithium polymerization teachniques. However, these polymers do not possess sufficient reactivity so as to be able to be cured within a reasonable period of time at elevated temperatures with organic peroxides. On the other hand, polydiolefins, such as polybutadiene of sufficiently high molecular weight and having predominantly a 1,2-vinyl structure, have the requisite degree of reactivity but disadvantageously have very high viscosities and thus require dilution with inert or reactive diluents.

The use of reactive or inert solvents with polymers is wholly undesirable with respect to encapsulation (e.g. encapsulation of electrical components) processes. Not only do these solvents represent a safety hazard due to their high volatility and flammability, but their solvency results in an attack on the base member to be encapsulated; in the case where the base member is an electrical component, the solvents will attack the insulation present thereon.

Further disadvantages of these solvents are as follows:

(1) some heating is usually employed during encapsulation processes to reduce the viscosity of the polymer or polymer solution, and temperatures to which these polymer solutions can be heated are limited in view of the volatile nature of the solvent;

(2) similarly, during encapsulation, the polymer is subjected to degassing in vacuo to permit good contact with the base member—such a degassing process further limits the temperature to which the polymer solution can be raised;

(3) during polymerization and curing of the polymer, an exotherm occurs which will cause solvent vaporization with consequent formation of bubbles, fissures, pin-holes, etc. in the casting;

(4) the density of a cured casting is higher than that of either the starting liquid polymer or a solution of a polymer in reactive diluent. This density difference results in shrinkage which sets up stresses leading to cracks and poor contact of the casting with the base member. The shrinkage encountered with the use of reactive diluents is much larger than with an undiluted liquid polymer because the density of liquid polymer is higher than that of the reactive diluent;

(5) inert diluents are not usable since they cannot be completely removed during encapsulation without disruption of the polymeric casting.

THE PRESENT INVENTION

It has now been discovered that a solventless, highly reactive block polymer having a viscosity suitable for encapsulation processes can be prepared. The term "block polymer" as employed herein means one which is selected from the group consisting of (a) a multivinyl aromatic hydrocarbon copolymerized with a homopolydiolefin and (b) a multivinyl aromatic hydrocarbon terpolymerized with a diolefin-monovinyl aromatic hydrocarbon copolymer.

Ordinarily the diolefin will be a conjugated diene which contains 4 to 10 carbon atoms, preferably 4 to 6 carbon atoms. Examples of suitable diolefins include 1,3-butadiene, 2-methyl-1,3-butadiene (isoprene), 1,3-pentadiene (piperylene), 2,3-dimethyl-1,3-butadiene, etc. and mixtures thereof.

The multivinyl aromatic hydrocarbon is one which contains from 10 to 40 carbon atoms. The multivinyl aromatic hydrocarbons may thus be represented by the formula:

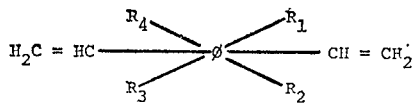

wherein $\phi$ is an aromatic nucleus such as benzene, naphthalene, biphenyl, phenanthrene, etc., and $R_1$, $R_2$, $R_3$ and $R_4$ are each independently selected from the group consisting of hydrogen, $C_1$ to $C_{12}$ alkyl or cycloalkyl groups and vinyl groups. Specific nonlimiting examples of suitable multivinyl aromatic hydrocarbons include divinyl benzene, divinyl toluene, divinyl xylene, isopropenyl styrene, diisopropenyl benzene, trivinyl benzene, divinyl naphthalene, etc.; preferred herein is divinyl benzene. The multivinyl aromatic hydrocarbon is generally utilized in amounts of about 0.5 to 10 mole percent, preferably 2.5 to 5 mole percent, based on the number of monomeric units present in the homopolydiolefin or diolefin-monovinyl aromatic hydrocarbon copolymer, i.e. the "base" homopolymer or "base" copolymer. Amounts of the multivinyl aromatic hydrocarbon in excess of 10 mole percent should be avoided since they lead to gelled, rather than liquid, polymers.

The monovinyl aromatic hydrocarbon employed in the preparation of the diolefin-monovinyl aromatic hydrocarbon copolymer (which in turn is utilized in the preparation of the room temperature-pourable terpolymer) contains from 8 to 40 carbon atoms and is represented by the general formula:

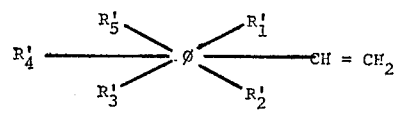

wherein $\phi$ is an aromatic nucleus and $R_1'$, $R_2'$, $R_3'$, $R_4'$ and $R_5'$ are each independently selected from the group consisting of hydrogen and $C_1$ to $C_{15}$ alkyl or cycloalkyl groups. The monovinyl aromatic hydrocarbon is generally utilized in amounts which lead to the incorporation of up to about 50 mole percent, preferably up to 30 mole percent, of monovinyl aromatic hydrocarbon monomeric units, based on the total number of monomeric units in the diolefin-monovinyl aromatic hydrocarbon copolymer.

Nonlimiting examples of suitable monovinyl aromatic hydrocarbons include styrene,
3-methylstyrene,
3-ethylstyrene,
3,5-diethylstyrene,
4-n-propylstyrene,
2,4,6-trimethylstyrene,
4-dodecylstyrene,
3-methyl-5-n-hexylstyrene,
4-cyclohexylstyrene,
4-phenylstyrene,
2-ethyl-4-benzylstyrene,
4-p-tolylstyrene,
3,5-diphenylstyrene,
2,4,6-tri-tert.-butylstyrene,
2,3,4,5-tetramethylstyrene,
4-(4-phenyl-n-butyl)-styrene,
3-(4-n-hexylphenyl)-styrene,
1-vinylnaphthalene,
2-vinylnaphthalene,
4,5-dimethyl-1-vinylnaphthalene,
3-ethyl-1-vinylnaphthalene,
6-isopropyl-1-vinylnaphthalene,
2,4-diisopropyl-1-vinylnaphthalene,
3,6-di-p-tolyl-1-vinylnaphthalene,
6-cyclohexyl-1-vinylnaphthalene,
4,5-diethyl-8-octyl-1-vinylnaphthalene,
3,4,5,6-tetramethyl-1-vinylnaphthalene,
3,6-di-n-hexyl-1-vinylnaphthalene,
8-phenyl-1-vinylnaphthalene,
5-(2,4,6-trimethylphenyl)-1-vinylnaphthalene,
4-n-propyl-5-n-butyl-2-vinylnaphthalene,
3-methyl-5,6-diethyl-8-n-propyl-2-vinylnaphthalene,
4-o-tolyl-2-vinylnaphthalene, and
5-(3-phenyl-n-propyl)-2-vinylnaphthalene.

For the purposes of this invention, it is necessary that the multivinyl aromatic hydrocarbon be copolymerized or terpolymerized with a pre-formed "base" homopolymer or copolymer, i.e. the homopolydiolefin, or diolefin-monovinyl aromatic hydrocarbon copolymer, respectively. That is, suitable room temperature-pourable polymers ordinarily cannot be prepared by directly copolymerizing or terpolymerizing a monomeric mixture of diolefin and multivinyl aromatic hydrocarbon, or diolefin, monovinyl aromatic hydrocarbon and multivinyl aromatic hydrocarbon, respectively.

The "base" homopolymer, i.e. the homopolydiolefin, will ordinarily contain a total of about 5 to about 200, preferably 10 to 100, diolefinic monomeric units while the "base" copolymer, i.e. the diolefin-monovinyl aromatic hydrocarbon copolymer, will also contain a total of about 5 to about 200, preferably 10 to 100, monomeric units which in turn may consist of at least about 50 mole percent, preferably at least 70 mole percent, of diolefinic monomeric uints and up to about 50 mole percent, preferably up to 30 mole percent, of monovinyl aromatic hydrocarbon monomeric units.

The polymers resulting from the copolymerization or terpolymerization of a multivinyl aromatic hydrocarbon with a homopolydiolefin or diolefin-monovinyl aromatic hydrocarbon copolymer, respectively, will be substantially solvent-free but yet pourable (i.e. liquid) at room temperature. These room temperature-pourable polymers generally have a bulk viscosity of about 0.05 to about 200 stokes, preferably 0.1 to 100 stokes, measured at room temperature (i.e. 16–25° C.).

The first step in obtaining the novel polymers of this invention is to prepare the base polymer, i.e. the homopolydiolefin or diolefin-monovinyl aromatic hydrocarbon copolymer. This may be accomplished by contacting appropriate amounts of the monomer (or monomers) with an organolithium catalyst in the presence of an inert diluent in which the catalyst is suffiicently soluble. The first step results in the formation of a "living" lithium-containing homopolydiolefin or "living" lithium-containing copoymer of a diolefin and monovinyl aromatic hydrocarbon; the term "living" is employed to denote that the lithium-containing homopolymer or copolymer is capable of forming block copolymers or block terpolymers upon addition of further amounts of multivinyl aromatic hydrocarbon without the need to add further amounts of organolithium catalyst.

The organolithium catalyst suitable for the purposes of this invention may be represented by the formula RLi, wherein R is a $C_2$ to $C_{20}$ alkyl, aralkyl or cycloalkyl group; materials such as methyllithium or phenyllithium are thus unsuitable. Nonlimiting examples of suitable organolithium catalysts are n-propyllithium, isopropyllithium, n-butyllithium, tert.-octyllithium, n-decyllithium, benzyllithium, 4-phenyl-n-butyllithium, cyclohexyllithium, 4-cyclohexyl-n-butyllithium, etc.; particularly preferred herein are the butyllithiums, i.e. normal-, sec-, iso and tertiary-butyllithiums.

In contrast to Ser. No. 424,829 (filled Jan. 11, 1965, and allowed Oct. 18, 1968) entitled "Laminating Varnish Consisting of Low Viscosity Block Copolymer," cocatalysts such as monoamines, diamines, polyamines, ethers, polyethers, cyclic ethers, thioethers, polythioethers, cyclic thioethers, etc., are not employed in conjunction with the catalyst system of this invention. Such cocatalysts lead to the production of polymers having high (at least 50 mole percent, preferably at least 75 mole percent) 1,2- or 3,4- structures. In the instant invention it is necessary that the polymers have a high (at least 80 mole percent) 1,4- structure.

As mentioned above, an inert diluent, in which the organolithium catalyst is soluble, is preferably employed in the preparation of the base polymer. The inert diluent may contain from 4 to 16 carbon atoms. Suitable inert diluents include aliphatics such as n-pentane, n-hexane, isooctane, n-nonane, etc.; alicyclics such as cyclopentane, cyclohexane, cycloheptane, etc., and aromatics such as benzene, toluene, xylene, chlorobenzene, etc. The amount of diluent employed in the preparation is not critical, except that sufficient amounts should be used to solubilize the amount of organolithium catalyst used. Generally, 0.5 to 200, preferably 1 to 50, liters of the diluent per mole of organolithium catalyst are employed during the preparation of the base polymer.

The amount of organolithium catalyst employed in the preparation of the base polymer is interdependent upon the amount of monomer used and the amount of monomer used in turn depends upon the desired degree of polymerization of the base monomer (or monomers); the term "degree of polymerization" (symbolized as "DP") as employed herein means that total number of diolefinic units or diolefin-monovinyl aromatic hydrocarbon monomeric units present in the base homopolymer or copolymer, respectively. As a generalization, it has been found that ordinarily each mole of organolithium catalyst of the type described above will generate a mole of polymer. Thus degree of polymerization may be conveniently defined by the generalization:

Degree of polymerization $$= \frac{\text{Total moles of monomers}}{\text{Moles of organolithium catalyst}}$$

Since the desirable total number of monomeric units in the base homopolymer or base copolymer has been described above as being about 5 to about 200, preferably 10 to 100, it is apparent that about 0.005 to about 0.2, preferably 0.01 to 0.1, mole of organolithium catalyst, per mole of total monomers in the base homopolymer or base copolymer, are ordinarily utilized in the preparation of the base homopolymer or base copolymer.

The reaction conditions for the preparation of the base polymer are not critical but for convenience sake the polymerization reaction generally takes place at 0° to 100° C., preferably 20° to 60° C. for 20 minutes to 24 hours, preferably 40 minutes to 3 hours; pressures may range from subatmospheric to supra-atmospheric, preferably atmospheric.

After the "living," lithium-containing base polymer has been prepared, the multivinyl aromatic hydrocarbon of choice in an amount within the range set forth above is added to the reaction mixture. The copolymerization or terpolymerization of the multivinyl aromatic hydrocarbon with the base homopolydiolefin or base diolefin-monovinyl aromatic hydrocarbon copolymer, respectively, then takes place at temperatures in the range of about −30° to about +50° C., preferably 0° to 40° C., over a period of time ranging from about 1 minute to about 2 hours, preferably 2 minutes to 1 hour; pressures may range from subatmospheric to supra-atmospheric, preferably atmospheric. The viscosity of the resultant copolymer or terpolymer is somewhat dependent upon the reaction conditions employed during the copolymerization or terpolymerization reaction, but the range of conditions set forth immediately above will generally result in a room temperature-pourable polymer having a bulk viscosity of about 0.05 to about 200 stokes, measured at room temperature.

The second step of the reaction may be practiced by several methods. Thus in the first method the multivinyl aromatic hydrocarbon is added to the lithium-containing homopolydiolefin to form a lithium-containing block copolymer. In the second method, a mixture of monomeric diolefin and monovinyl aromatic hydrocarbon is copolymerized to form a lithium-containing copolymer to which is then added the multivinyl aromatic hydrocarbon thereby forming a lithium-containing block terpolymer. In the third method, the monovinyl aromatic compound is added to the lithium-containing homopolydiolefin, thereby obtaining a lithium-containing polydiolefin-monovinyl aromatic hydrocarbon copolymer and thereafter the multivinyl aromatic compound is added so as to yield a lithium-containing block terpolymer.

In the fourth "serial" method, a lithium-containing block copolymer is first prepared by (a) preparing a lithium-containing homopolydiolefin and thereafter adding the monovinyl aromatic hydrocarbon or (b) copolymerizing a mixture of the monomeric diolefin and monovinyl aromatic hydrocarbon. To the lithium-containing block copolymer is added the monomeric diolefin, then (if desired) monovinyl aromatic hydrocarbon, etc., and finally completing the reaction with addition of the multivinyl aromatic hydrocarbon so as to obtain a lithium-containing block terpolymer.

Thus, it can be seen from the above methods that the block polymers of the instant invention are substantially of the non-repetitive A–B type wherein A and B represent blocks within said polymer with A being selected from the group consisting of a homopolymer of a conjugated diolefin as previously described, a random copolymer of said diolefin and a monovinyl aromatic hydrocarbon (as shown in the second method) and a block copolymer of said diolefin and said monovinyl aromatic hydrocarbon (as in the third method). B is the multivinyl aromatic hydrocarbon which is added to the preformed polymer to complete the reaction, thus making the polymer non-repetitive. As stated previously, the multivinyl aromatic hydrocarbon should be present in an amount of about 0.5 to 10 mole percent based on the total number of monomeric units in A; i.e., the total number of monomeric units present in the "base" homo- or copolymer.

The lithium-containing block copolymer cannot be prepared by copolymerizing a mixture of monomeric diolefin and multivinyl aromatic hydrocarbon since this results in an insoluble crosslinked copolymer. Similarly, the "serial" method cannot be used to prepare the lithium-containing diolefin-multivinyl aromatic hydrocarbon copolymer since such method will result in the formation of an insoluble crosslinked copolymer.

The room temperature-pourable polymer is recovered by procedures well known in the prior art. Polar materials, such as water or $C_1$ to $C_5$ alkanols, can be added to inactivate the catalyst, followed by washing of the hydrocarbon solution with water or dilute mineral acids. Alternatively, the active polymer solution can be treated with hydrated clays (such as natural Attapulgus clay) which function to both inactivate the catalyst and to chemicaly absorb the lithium component. The resultant polymer solutions are filtered, dried if necessary and stripped of inert diluent at elevated temperatures (e.g. 70° to 120° C.) and reduced pressures (e.g. 0.1–100 mm.

The following reactions illustrate the various methods for preparing the polymeric products of this invention:

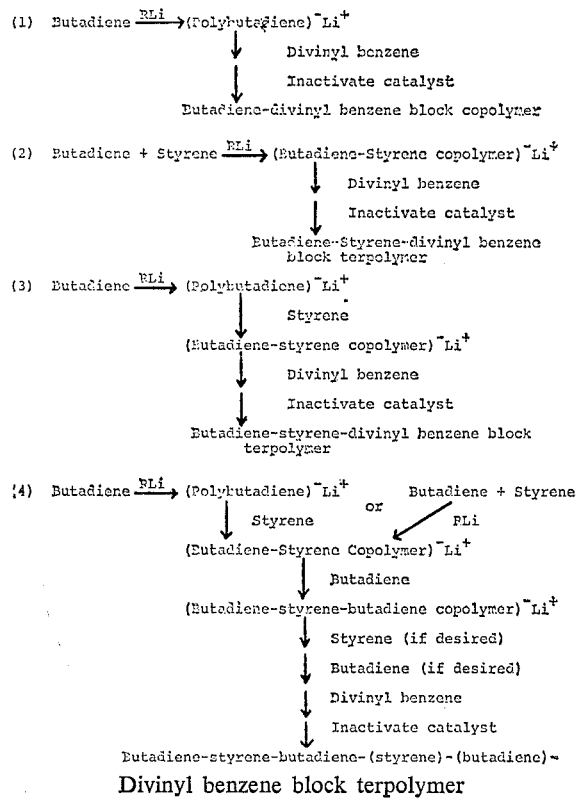

The multivinyl aromatic, such as divinyl benzene, is frequently diluted with monovinyl aromatic, such as ethyl styrene, to prevent gelation during storage. These mixtures can be used in place of the pure multivinyl aromatics with no significant change in base polymer properties.

The component to be encapsulated may be impregnated with the room temperature-pourable polymers of this invention at temperatures of about 20° to 120° C. and the polymer thereafter cured in situ on the component at elevated temperatures in the presence of one or more organic peroxides. The organic peroxide curing agents are usually added to the room temperature-pourable polymer prior to the impregnation process in amounts ranging from about 0.5 to about 10 parts, preferably 1 to 6 parts, by weight, per 100 parts of the polymer. The peroxide curing agent may be any of those used for curing diolefinic homopolymers and copolymers such as di-tert.-butyl peroxide, 2,5-dimethyl-2,5-bis(tert.-butyl peroxy) hexane, 2,5-dimethyl-2,5-bis-(tert.-butyl peroxide) hexyne-3, benzoyl peroxide, di-tert.-butyl-diperphthalate, tert.-butyl perbenzoate, dicumyl peroxide, cumene hydroperoxide, 2,4-di-(tert.-butyl peroxyisopropyl) benzene, tert.-butyl cumyl peroxide, etc. and mixtures thereof.

Curing conditions are conventional, i.e. at 90° to 180° C. for 15 minutes to 48 hours. If desired the room temperature-pourable polymer may be blended with conventional anti-oxidants (such as 2,6-di-tert.-butyl-p-cresol and t-butyl hydroquinone), pigments, fillers, etc. provided the overall bulk viscosity of the blend is within the range of 0.05 to 200 stokes at room temperature.

In commercial impregnating processes, it is ordinarily required that, at the impregnating temperature, the polymer have a bulk viscosity of 1.0 stoke or less. As will be seen from the examples below, the polymers of this invention are thus ideally suited for such processes. Indeed, because of the low bulk viscosities of the instant polymers, impregnation can be carried out at substantially lower temperatures than are customarily employed. Conversely where extremely low bulk viscosities are deemed necessary for impregnation, the polymers of this invention may be utilized at impregnation temperatures higher than 135° C. since they contain no volatile materials.

The following examples are submitted to illustrate the invention. Unless otherwise indicated, all parts and percentages are by weight.

EXAMPLE 1

A butadiene-divinyl benzene copolymer having a degree of polymerization of about 20 (DP 20) was prepared under a nitrogen atmosphere as follows: a reaction vessel was charged with 2070 g. of toluene and 213 g. of a 15% solution of n-butyllithium in n-hexane (0.5 mole of n-butyllithium). The resultant solution was heated to 40° C. and 513 g. (9.5 moles) of butadiene was added over a 1-hour period while stirring the solution at 40° C. Stirring was continued for an additional 2 hours at 40° C. and 65 g. of a 1:1 mixture of divinyl benzene and ethyl styrene was added all at once, while stirring. The reaction mixture was maintained at 40° C. and aliquot samples of the reaction mixture were taken at various time intervals. The polymer was recovered by the addition of 40 to 60 g. natural Attapulgus clay per 500 g. of sample, followed by filtration and stripping of the solvent at 100° C. and 2–4 mm. Hg for 2 hours. The results are shown in Table I.

TABLE I

| | Aliquot sample wt., g. | Time, min. | Recovered polymer wt. g. | Recovered polymer bulk viscosity, stokes [1] |
|---|---|---|---|---|
| Aliquot Sample: | | | | |
| A | 530.7 | 5 | 97.5 | 0.89 |
| B | 476 | 10 | 94.5 | 0.89 |
| C | 500 | 15 | 88.8 | 1.29 |
| D | 501 | 30 | 89.5 | 4.43 |
| E | | 60 | 135.1 | 5.00 |

[1] Measured at 25° C.

The data in Table I illustrate that copolymers of about DP 20 with a divinyl benzene content of 2.5 mole percent can be readily prepared. In particular, it is seen that Samples A and B could be used for room temperature impregnations while Samples C, D and E could be used for impregnation at only slightly elevated temperatures.

EXAMPLE 2

In accordance with the procedure set forth in Example 1, butadiene-divinyl benzene copolymers of about DP 20 were prepared under a nitrogen atmosphere from the following: toluene, 2070 g.; 15% n-butyllithium in n-hexane, 213 g. (0.5 mole of n-butyllithium); butadiene, 486 g. (9.0 moles); and 1:1 mixture of divinyl benzene and ethyl styrene, 130 g. (0.5 mole of divinyl benzene, 0.5 mole of ethyl styrene). As in Example 1, aliquot samples of the reaction mixture were withdrawn from the reaction mixture at various time intervals and the bulk viscosities of the polymers recovered therefrom were measured at room temperature. The results of this example are shown in Table II.

TABLE II

| Aliquot Sample: | Aliquot sample wt., g. | Time, mins. | Recovered polymer wt., g. | Recovered polymer bulk viscosity, stokes [1] |
|---|---|---|---|---|
| F | 555.5 | 5 | 100.9 | 0.60 |
| G | 473.4 | 10 | 82.0 | 1.65 |
| H | 433.0 | 30 | 80.5 | 78.0 |
| I | 833.5 | 60 | 140.9 | 88.0 |

[1] Measured at 25° C.

The data in Table II illustrate that a copolymer containing 5 mole percent divinyl benzene can be readily prepared. In particular, they point out that Sample F would be suitable for room temperature impregnations, whereas Sample G could be used at slightly elevated impregnation temperatures; the wide variation between the viscosities of Samples H and I and Samples F and G indicates that the viscosity of the product may be readily controlled by controlling the copolymerization reaction time.

EXAMPLE 3

Copolymers with a DP of about 100 were prepared under a nitrogen atmosphere as follows: a reaction vessel was charged with 2070 g. of toluene and 61.8 ml. of a 15% solution of n-butyllithium in n-hexane (0.1 mole of n-butyllithium). This solution was heated to 60° C., and 513 g. (9.5 moles) of butadiene was added with stirring, over the period of 1 hour at 60° C. The solution was stirred for an additional 2 hours at 60° C. and cooled to 25° C. Sixty-five g. of 50% divinyl benzene (0.25 mole divinyl benzene, 0.25 mole of ethyl styrene) was added all at once, with stirring, and the temperature maintained at 25° C. Aliquot samples were periodically drawn from the reaction mixture and worked up as in Example 1. Table III indicates the results of this example.

TABLE III

| Aliquot Sample: | Aliquot sample wt., g. | Time, mins. | Recovered polymer wt., g. | Recovered polymer bulk viscosity stokes [1] |
|---|---|---|---|---|
| J | 472.8 | 10 | 89.1 | 43.0 |
| K | 691.7 | 20 | 132.9 | 57.0 |
| L | 436.6 | 30 | 79.3 | 94.0 |
| M | 413.6 | 45 | 80.0 | 123.5 |
| N | 496.0 | 60 | 107.1 | 300.0 |

[1] Measured at 25° C.

The data in Table III illustrate that a copolymer with a degree of polymerization of about 100 and a divinyl benzene content of 2.5 mole percent can be readily prepared; Table III also points out the need for careful control of the copolymerization reaction in order to obtain copolymers with commercially useful viscosities.

EXAMPLE 4

Several of the copolymers prepared in Example 3 were blended as follows:

| | Parts |
|---|---|
| Copolymer | 10.0 |
| 2,5-dimethyl-2,5-di-tert.-butyl peroxyhexane | 0.2 |
| Tert.-butyl perbenzoate | 0.05 |

The blends were thereafter heated for 20 minutes at 160° C. and a cured rubbery mass was obtained. Properties of the product are shown in Table IV.

TABLE IV

| | Copolymer bulk viscosity, stokes | Cured copolymer Shore A hardness |
|---|---|---|
| Copolymer Sample: | | |
| J | 43.0 | 20–22 |
| K | 57.0 | 38–40 |
| L | 94.0 | 12–15 |

EXAMPLE 5

A low molecular weight polybutadiene (number-average molecular weight about 1200) was prepared in a conventional manner by the sodium-catalyzed polymerization of butadiene. This polybutadiene sample had a bulk viscosity of about 20 stokes (measured at room temperature) and thus met the viscosity requirements for impregnation processes. However, after blending this polybutadiene sample with 2 parts, per hundred parts of polybutadiene, of 2,5-dimethyl-2,5-di-tert.-butyl peroxyhexane and 0.5 part, per hundred parts of polybutadiene, of t-butyl perbenzoate and curing the blend at 160° C. for 20 minutes, the material remained liquid in nature and exhibited only a slight increase in viscosity.

EXAMPLE 6

Polybutadiene was prepared by polymerizing butadiene with a n-butyllithium catalyst in accordance with the procedure set forth in Example 1. No multivinyl aromatic hydrocarbon was employed and after the homopolymerization reaction had been completed, the reaction mixture was treated with natural Attapulgus clay, filtered and vacuum stripped to recover the polybutadiene. As thus prepared, the polybutadiene had a number-average molecular weight of about 1000, a degree of polymerization of about 19 and a bulk viscosity of about 1.3 stokes (measured at room temperature). This polybutadiene sample was then cured in accordance with the blend recipe and curing conditions set forth in Example 5, but the cured material remained liquid in nature and exhibited only a slight increase in viscosity.

A comparison of the results obtained in Examples 5 and 6 with those obtained in Example 4 indicates that a low molecular weight "base polymer," as prepared by sodium or alkyllithium catalysis, possesses a reactivity insufficient to permit its use in encapsulating processes. That is, although these homopolymers have suitable low bulk viscosities, they do not cure to rubbery masses (as required for encapsulation processes) as is the case of the copolymers of the instant invention (see Example 4).

EXAMPLE 7

A low molecular weight polybutadiene with high 1,2-enchainment was prepared under a nitrogen atmosphere as follows: a reaction vessel was charged with 630 g. of n-heptane, 202 g. of tetrahydrofuran (2.8 moles), and 120 g. of a 15% solution of n-butyllithium in n-hexane (0.28 mole of n-butyllithium). The resultant solution was stirred at 25° C. and 300 g. (5.6 moles) of butadiene was added over a 1-hour period. Stirring was continued for an additional 2 hours at 25° C., then the catalyst was deactivated by the addition of 100 ml. of water. The heptane solution was washed with water until the washings were neutral to litmus, dried over anhydrous MgSO$_4$, filtered and stripped of solvent at 100° C. and 2–4 mm. Hg for 2 hours.

The resultant polymer had a number-average molecular weight of 1000 (measured by vapor phase osmometry), a viscosity of 378 stokes (measured at 25° C.) and contained 90% 1,2-vinyl structure (measured by infrared spectroscopy).

This illustrates that low molecular weight polybutadienes with a high 1,2-vinyl structure do not have the low bulk viscosity necessary for solventless encapsulation.

EXAMPLE 8

Sample J of Example 3 was blended with 2.5 parts, per hundred parts of copolymer, of 2,5-dimethyl-2,5-tert.-butyl peroxyhexane and 0.5 part, per hundred parts of copolymer, of tert.-butyl perbenzoate. The blend (a total of 20 parts) was employed in the vacuum impregnation of 75 parts of 10–20 mesh sand in accordance with the conventional techniques followed in commercial impregnation processes. It was noted that the sand was readily impregnated with the blend at room temperature. The sand-filled composition was cured at 160° C. for about 75 minutes to a Shore A hardness of 30–50. This result indicates that the novel polymers of this invention are highly useful in the impregnation of sand-filled assemblies such as solid state transformers.

EXAMPLE 9

In accordance with the procedure set forth in Example 1, a butadiene-styrene copolymer is first prepared by polymerizing at about 40° C. a monomeric mixture of 410 parts of butadiene and 198 parts of styrene in the presence of about 2070 parts of an inert diluent such as toluene and 213 parts of a 15% solution of n-butyllithium in n-hexane. The base copolymer as thus produced ordinarily contains about 80 mole percent monomeric units of butadiene and 20 mole percent of monomeric units of styrene. To the resultant solution is added all at once about 65 g. of a 1:1 mixture of divinyl benzene and ethyl styrene and the terpolymerization is conducted at 40° C. for about 5 to 60 minutes. After working up the reaction mixture with natural Attapulgus clay, filtering and vacuum stripping, it is found that a terpolymer having a bulk viscosity of 15 to 100 stokes (measured at room temperature) is obtained (the particular bulk viscosity obtained will be dependent upon the time allotted to the terpolymerization reaction). It is found that upon curing a blend of this terpolymer with the peroxide recipe and curing conditions set forth in Example 4, a rubbery mass having a Shore A hardness of 15–45 is obtained.

EXAMPLE 10

A butadiene-styrene copolymer was prepared at 25° C. under a nitrogen atmosphere as follows: a reaction vessel was charged with 4590 g. of toluene and 1700 g. of a 15% solution of n-butyllithium in n-hexane (4.0 moles of n-butyllithium). To the stirred catalyst solution 326 g. of butadiene (60 moles) and 1664 g. of styrene (16 moles) were added simultaneously over a 1-hour period. Stirring was continued for 4 hours, then the catalyst was deactivated by the addition of water. The polymer solution was worked up as described in Example 7.

The copolymer had a number-average molecular weight of 1200 (measured by vapor phase osmometry) and a viscosity of 25 stokes at 25° C.

A sample of this copolymer was cured in accordance with the recipe and curing conditions set forth in Example 5, but the material remained liquid and showed only a slight increase in viscosity. This result indicates that low molecular weight base copolymers prepared by alkyllithium catalysis have a bulk viscosity that is suitable for solventless encapsulation, but they do not cure to rubbery masses as required in encapsulation processes (since no multivinyl aromatic hydrocarbon as present).

EXAMPLE 11

A copolymer with a DP of about 105 is prepared under a nitrogen atmosphere as follows: a reaction vessel is charged with 2070 g. toluene and 61.8 ml. of a 15% solution of n-butyllithium in n-hexane (0.1 mole of n-butyllithium). The solution is heated to 60° C. and 203 g. of butadiene (3.75 moles) is added with stirring over a period of ½ hour. Stirring is continued for an additional hour, and then 260 g. (2.5 moles) of styrene is added with stirring. Stirring is continued for an additional hour at 60° C. Then an additional 203 g. of butadiene (3.75 moles) is added over a period of ½ hour and after addition, stirring is continued for an hour at 60° C. The resultant solution is cooled to 25° C. and 65 g. of 50% divinyl benzene (0.25 mole divinyl benzene, 0.25 mole ethyl styrene) is added all at once. Stirring is continued for 20 minutes at 25° C. and then the polymerization reaction is immediately terminated by the addition of natural Attapulgus clay. After filtration and solvent removal, a polymeric product is obtained possessing a bulk viscosity of less than 75 stokes at 25° C.

When the product is formulated according to Example 8 and cured at 160° C. for 75 minutes, the cured composition possesses a Shore A hardness of 30–50.

This example illustrates that curable, room-temperature-pourable terpolymers of butadiene, styrene and divinyl benzene can be prepared by sequential addition of butadiene and styrene followed by final addition of divinyl benzene.

As many apparently widely different embodiments of this invention may be made without departing from the spirit and scope of it, it is to be understood that the present invention is not to be limited to the specific embodiments herein except as defined in the appended claims.

What is claimed is:

1. A substantially solventless block polymer having a bulk viscosity of about 0.05 to about 200 stokes, measured at room temperature, said polymer being substantially of the non-repetitive A–B type wherein A and B represent blocks within said polymer with A being selected from the group consisting of a homopolymer of a conjugated diolefin having 4 to 10 carbon atoms, a random copolymer of said diolefin and a monovinyl aromatic hydrocarbon, and a block copolymer of said diolefin and said monovinyl aromatic hydrocarbon; and with B being a multivinyl aromatic hydrocarbon present in an amount of about 0.5 to 10 mole percent based on the total number of monomeric units in A and being represented by the formula:

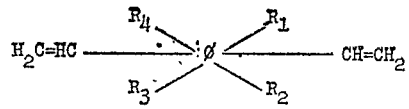

wherein $\phi$ is an aromatic nucleus and $R_1$, $R_2$, $R_3$ and $R_4$ are each indepedently selected from the group consisting of hydrogen, $C_1$ to $C_{12}$ alkyl, $C_1$ to $C_{12}$ cycloalkyl groups and vinyl groups.

2. The block polymer of claim 1 in which the diolefin is a $C_4$–$C_6$ conjugated diene.

3. The block polymer of claim 1 in which the monovinyl aromatic hydrocarbon contains from 8 to 40 carbon atoms and is represented by the formula:

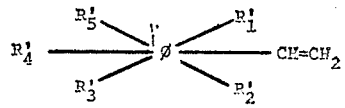

wherein $\phi$ is an aromatic nucleus and $R_1'$, $R_2'$, $R_3'$, $R_4'$ and $R_5'$ are each indepedently selected from the group consisting of hydrogen, $C_1$ to $C_{15}$ alkyl and $C_1$ to $C_{15}$ cycloalkyl groups.

4. The block polymer of claim 1 in which the diolefin is 1,3-butadiene, the multivinyl aromatic is divinyl benzene and the monovinyl aromatic hydrocarbon is styrene.

5. The block polymer of claim 1 which has been cured at elevated temperatures in the presence of at least one organic peroxide.

6. The block polymer of claim 1 in which the multivinyl aromatic hydrocarbon is selected from the group consisting of divinyl benzene, divinyl toluene, divinyl xylene, isopropenyl styrene, diisopropenyl benzene, trivinyl benzene and divinyl naphthalene.

7. The block polymer of claim 1 in which the conjugated diolefin is selected from the group consisting of 1,3-butadiene, 2-methyl-1,3-butadiene, 1,3-pentadiene, 2,3-dimethyl-1,3-butadiene and mixtures thereof.

References Cited

UNITED STATES PATENTS

| | | | |
|---|---|---|---|
| 3,078,254 | 2/1963 | Zelinski et al. | 260—880 |
| 3,185,659 | 5/1965 | Adams et al. | 260—880 |
| 3,231,635 | 1/1966 | Holden et al. | 260—880 |
| 3,280,084 | 10/1966 | Zelinski et al. | 260—880 |
| 3,439,064 | 4/1969 | Makowski et al. | 260—880 |
| 3,428,699 | 2/1969 | Schleimer | 260—669 |

FOREIGN PATENTS

| | | | |
|---|---|---|---|
| 1,025,295 | 4/1966 | Great Britain | 260—880 |

JAMES A. SEIDLECK, Primary Examiner

U.S. Cl. X.R.

260—83.7, 669 P